United States Patent
Inoue et al.

(10) Patent No.: US 11,428,409 B2
(45) Date of Patent: Aug. 30, 2022

(54) COMBUSTOR AND GAS TURBINE INCLUDING THE SAME

(71) Applicant: Mitsubishi Power, Ltd., Kanagawa (JP)

(72) Inventors: Kei Inoue, Tokyo (JP); Keijiro Saito, Tokyo (JP); Yuichi Ichikawa, Tokyo (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 0 days.

(21) Appl. No.: 17/274,940

(22) PCT Filed: Sep. 26, 2019

(86) PCT No.: PCT/JP2019/037744
§ 371 (c)(1),
(2) Date: Mar. 10, 2021

(87) PCT Pub. No.: WO2020/067231
PCT Pub. Date: Apr. 2, 2020

(65) Prior Publication Data
US 2022/0034510 A1 Feb. 3, 2022

(30) Foreign Application Priority Data

Sep. 26, 2018 (JP) .............................. JP2018-180019

(51) Int. Cl.
*F23R 3/00* (2006.01)
*F02C 7/22* (2006.01)

(52) U.S. Cl.
CPC ................ *F23R 3/002* (2013.01); *F02C 7/22* (2013.01); *F05D 2240/35* (2013.01); *F23R 2900/03043* (2013.01)

(58) Field of Classification Search
CPC ........ F02C 9/26; F02C 9/00; F02C 9/28; F02C 7/22; F02C 7/222; F02C 7/224;
(Continued)

(56) References Cited

U.S. PATENT DOCUMENTS 6,209,325 B1 4/2001 Alkabie
2011/0179803 A1 7/2011 Berry et al.
(Continued)

FOREIGN PATENT DOCUMENTS

CN 102798150 11/2012
CN 102971510 3/2013
(Continued)

OTHER PUBLICATIONS

International Search Report dated Nov. 19, 2019 in International (PCT) Application No. PCT/JP2019/037744 with English translation.
(Continued)

*Primary Examiner* — Todd E Manahan
*Assistant Examiner* — Rodolphe Andre Chabreyrie
(74) *Attorney, Agent, or Firm* — Wenderoth, Lind & Ponack, L.L.P.

(57) ABSTRACT

A combustor includes: a fuel nozzle for injecting fuel; a combustion liner surrounding a combustion space for combusting the fuel and having an internal passage having an outlet communicating with the combustion space; and an air-fuel mixture line, connected to an inlet of the internal passage of the combustion liner, for introducing an air-fuel mixture containing the fuel and compressed air to the internal passage. The combustion liner is configured to be cooled by the air-fuel mixture flowing through the internal passage.

13 Claims, 5 Drawing Sheets

(58) Field of Classification Search
CPC .... F02C 7/18; F23R 3/002; F23R 3/06; F01N 2270/00; F01N 3/0205; F01N 3/02
See application file for complete search history.

(56) References Cited

U.S. PATENT DOCUMENTS

| | | |
|---|---|---|
| 2011/0239654 A1 | 10/2011 | Bland et al. |
| 2012/0297786 A1 | 11/2012 | Crawley et al. |
| 2013/0098063 A1 | 4/2013 | Mizukami et al. |
| 2014/0096529 A1* | 4/2014 | Overby ............... F23L 7/00 60/772 |
| 2017/0138201 A1* | 5/2017 | Takata ............... F01D 9/023 |

FOREIGN PATENT DOCUMENTS

| | | |
|---|---|---|
| GB | 2 097 476 | 11/1982 |
| JP | 2000-046333 | 2/2000 |
| JP | 2011-153815 | 8/2011 |
| JP | 2012-077660 | 4/2012 |

OTHER PUBLICATIONS

International Preliminary Report on Patentability dated Apr. 8, 2021 in (PCT) Application No. PCT/JP2019/037744 with English translation.

* cited by examiner

COMBUSTOR AND GAS TURBINE INCLUDING THE SAME

TECHNICAL FIELD

This disclosure relates to a combustor and a gas turbine including the same.

BACKGROUND

In a combustor used in a gas turbine, it is desirable to reliably cool hot parts.

For example, Patent Document 1 discloses a combustor configured such that a part of compressed air produced by a compressor is extracted, and the extracted air is pressurized and then introduced to a cooling air passage formed in a combustion liner to cool the combustion liner by the extracted air.

In addition, Patent Document 2 discloses a combustor in which the air flowing adjacent to a diffuser wall is extracted, and an air-fuel mixture produced by injecting fuel to the extracted air is supplied to a combustion liner on the downstream side of a fuel nozzle, although it does not aim to cool the combustion liner.

CITATION LIST

Patent Literature

Patent Document 1: JP2012-77660A
Patent Document 2: JP2011-153815A

SUMMARY

Problems to be Solved

However, when a part of compressed air supplied from the compressor is used to cool the combustion liner as in Patent Document 1, the amount of compressed air supplied to the fuel nozzle outlet is reduced by the amount of compressed air used for cooling the combustion liner, so that the fuel-air ratio near the fuel nozzle outlet increases. As a result, the flame temperature near the fuel nozzle outlet increases, and $NO_X$, which is an air pollutant, may be produced.

In view of the above, an object of some embodiments of the present invention is to provide a combustor and a gas turbine including the same whereby it is possible to suppress the increase in flame temperature in the vicinity of the fuel nozzle outlet and reduce the production of $NO_X$.

Solution to the Problems (1) A combustor according to at least one embodiment of the present invention comprises: a fuel nozzle for injecting fuel; a combustion liner surrounding a combustion space for combusting the fuel and having an internal passage having an outlet communicating with the combustion space; and an air-fuel mixture line, connected to an inlet of the internal passage of the combustion liner, for introducing an air-fuel mixture containing the fuel and compressed air to the internal passage. The combustion liner is configured to be cooled by the air-fuel mixture flowing through the internal passage.

With the above configuration (1), the air-fuel mixture produced by mixing the compressed air and the fuel is used as a coolant for cooling the combustion liner. Accordingly, compared with the case where the coolant for cooling the combustion liner is only the compressed air, the amount of fuel supplied to the fuel nozzle outlet and the fuel-air ratio at the fuel nozzle outlet are relatively small. As a result, it is possible to suppress the increase in flame temperature in the vicinity of the fuel nozzle outlet and thus reduce the production of $NO_X$.

If the coolant for cooling the combustion liner is only the compressed air, the progress of the combustion reaction may be hindered by mixing of the coolant (compressed air) that does not contain fuel, and the CO concentration in the combustion gas discharged from the combustor may increase. In this regard, with the above configuration (1), since the air-fuel mixture supplied from the internal passage of the combustion liner to the combustion space contains fuel, the combustion reaction in the combustion space is promoted, and the CO concentration in the combustion gas discharged from the combustor is reduced. This is useful for low-load operation in which unburned CO is likely to be generated.

(2) In some embodiments, in the above configuration (1), the combustor may comprise: a compressed air line through which the compressed air flows; and a fuel supply part, disposed on the compressed air line, for supplying the fuel to the compressed air flowing through the compressed air line. The air-fuel mixture line may be configured such that the air-fuel mixture containing the fuel supplied from the fuel supply part and the compressed air flowing through the compressed air line is introduced to the internal passage.

With the above configuration (2), the fuel supply part supplies fuel to the compressed air supplied from the compressed air line, and the air-fuel mixture containing the compressed air and the fuel is produced. When the air-fuel mixture thus obtained is used for cooling the combustion liner, based on the principle described in the above (1), it is possible to suppress the increase in flame temperature in the vicinity of the fuel nozzle outlet and thus reduce the production of $NO_X$, compared with the case where the coolant for cooling the combustion liner is only the compressed air.

(3) In some embodiments, in the above configuration (2), the compressed air line may be configured to extract the compressed air from an intermediate stage of a compressor of a gas turbine that includes the combustor or a casing interior space of the gas turbine.

With the above configuration (3), the combustion liner can be cooled by using the compressed air produced by the compressor of the gas turbine. Further, when the air-fuel mixture obtained by adding the fuel to the extracted compressed air is used as the coolant for cooling the combustion liner, based on the principle described in the above (1), it is possible to suppress the increase in flame temperature in the vicinity of the fuel nozzle outlet and thus reduce the production of $NO_X$, compared with the case where the coolant for cooling the combustion liner is only the compressed air.

(4) In some embodiments, in the above configuration (2) or (3), the fuel supply part may have an airfoil shape including: a leading edge portion positioned on an upstream side in a flow direction of the compressed air in the compressed air line; and a trailing edge portion positioned on a downstream side of the leading edge portion in the flow direction and having a fuel injection hole for injecting the fuel downstream in the flow direction.

With the above configuration (4), on the downstream side of the trailing edge portion of the fuel supply part, the formation of a low flow rate region of the compressed air containing fuel (fuel-containing air) can be suppressed. As a result, it is possible to prevent the ignition of the fuel-containing air in the compressed air line.

(5) In some embodiments, in any one of the above configurations (2) to (4), the combustor may comprise a booster compressor disposed on the compressed air line.

With the above configuration (5), the air fed to the compressed air line can be pressurized. As a result, even if low-pressure air is fed to the compressed air line, the air in the compressed air line can be pressurized to a pressure suitable for supplying the air-fuel mixture to the internal passage of the combustion liner.

(6) In some embodiments, in any one of the above configurations (2) to (5), the combustor may comprise a cooler, disposed on the compressed air line, for cooling the compressed air.

With the above configuration (6), the compressed air can be cooled with the cooler. As a result, the compressed air having a temperature more suitable for cooling can be generated.

(7) In some embodiments, in any one of the above configurations (1) to (6), the air-fuel mixture line may include a blade ring cooling line passing inside a blade ring of a gas turbine that includes the combustor.

With the above configuration (7), not only the combustion liner but also the blade ring of the gas turbine can be cooled by using the air-fuel mixture as the coolant.

(8) In some embodiments, in the above configuration (7), the air-fuel mixture line may further include a bypass line bypassing the blade ring cooling line, and the combustor may further comprise a passage switching valve configured to switch a passage through which the air-fuel mixture flows, between the blade ring cooling line and the bypass line.

With the above configuration (8), the blade ring cooling line and the bypass line can be switched. As a result, for example, it is possible to select whether to use the blade ring cooling line or the bypass line according to the operating condition of the gas turbine, and effectively use the air-fuel mixture as the coolant for cooling.

(9) In some embodiments, in any one of the above configurations (1) to (8), a concentration of the fuel in the air-fuel mixture line may be equal to or less than a flammability limit concentration.

With the above configuration (9), it is possible to prevent the ignition of the air-fuel mixture in a space other than the combustion space inside the combustion liner. Further, it is possible to prevent the local temperature of flame from increasing in the vicinity of the position where the air-fuel mixture is supplied to the combustion space when the air-fuel mixture is introduced to the combustion space and combusted. As a result, it is possible to reduce the production of $NO_X$ in the combustion liner.

(10) In some embodiments, in any one of the above configurations (1) to (9), the outlet of the internal passage may be positioned downstream of a downstream end of the fuel nozzle in an axial direction of the combustion liner.

As described above, the air-fuel mixture supplied to the combustion space after passing through the internal passage of the combustion liner contains fuel.

With the above configuration (10), since the supply position of the air-fuel mixture containing fuel to the combustion space (i.e., outlet position of internal passage of combustion liner) is set on the downstream side of the downstream end of the fuel nozzle in the axial direction of the combustion liner, the fuel contained in the air-fuel mixture does not increase the fuel-air ratio in the vicinity of the fuel nozzle outlet. As a result, based on the principle described in the above (1), it is possible to reduce the combustion temperature of flame in the vicinity of the fuel nozzle outlet and thus reduce the production of $NO_X$, compared with the case where the coolant for cooling the combustion liner is only the compressed air.

(11) In some embodiments, in any one of the above configurations (1) to (10), the internal passage may include a plurality of linear passages extending in an axial direction of the combustion liner.

With the above configuration (11), since the air-fuel mixture serving as the coolant flows through the plurality of internal passages, it is possible to more efficiently cool the combustion liner.

(12) A gas turbine according to at least one embodiment of the present invention comprises: a compressor for producing compressed air; the combustor described in any one of the above configurations (1) to (11); and a turbine configured to be driven by a combustion gas from the combustor.

With the above configuration (12), based on the principle described in the above (1), it is possible to reduce the combustion temperature of flame in the vicinity of the fuel nozzle outlet and thus reduce the production of $NO_X$, compared with the case where the coolant for cooling the combustion liner is only the compressed air.

Advantageous Effects

According to some embodiments of the present invention, it is possible to suppress the increase in flame temperature in the vicinity of the nozzle outlet and reduce the production of $NO_X$.

DETAILED DESCRIPTION

Hereinafter, embodiments of the present invention will be described in detail with reference to the drawings.

However, the scope of the present invention is not limited to the following embodiments. It is intended that dimensions, materials, shapes, relative positions and the like of components described in the embodiments shall be interpreted as illustrative only and not intended to limit the scope of the present invention.

Figure 1:
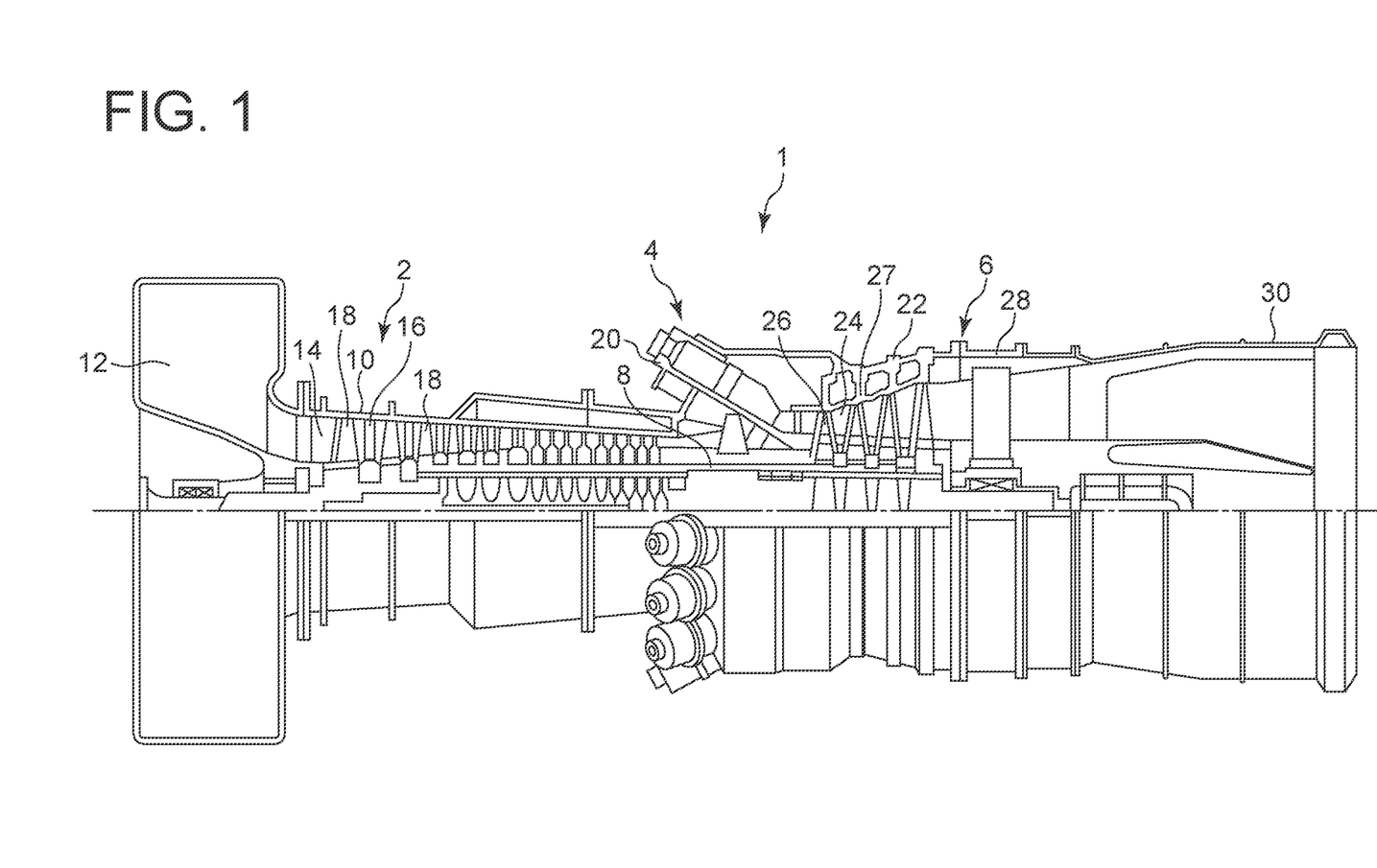
FIG. 1 is a schematic configuration diagram of a gas turbine according to an embodiment of the present invention.

FIG. 1 is a schematic configuration diagram of a gas turbine 1 according to an embodiment of the present invention.

As shown in FIG. 1, the gas turbine 1 according to an embodiment includes a compressor 2 for producing compressed air G, a combustor 4 for producing combustion gas using the compressed air G and fuel F, and a turbine 6 configured to be rotationally driven by the combustion gas. The rotational shaft of the compressor 2 and the rotational shaft of the turbine 6 are connected to each other and together constitute a rotor 8 of the gas turbine 1 shown in FIG. 1. When the turbine 6 is driven by the combustion gas, the rotational force of the turbine 6 is transmitted to the compressor 2 via the rotor 8 to drive the compressor 2. In the case of the gas turbine 1 for power generation, a generator (not illustrated) is connected to the turbine 6 side or the compressor 2 side of the rotor 8, so that rotational energy of the turbine 6 generates electric power.

Next, with reference to FIG. 1, the configuration of each part of the gas turbine 1 according to an embodiment will be described.

The compressor 2 includes a compressor casing 10, an air inlet 12 disposed on the inlet side of the compressor casing 10 for sucking in air, and a variety of blades disposed in the compressor casing 10. The variety of blades includes an inlet guide vane 14 disposed adjacent to the air inlet 12, a plurality of stator vanes 16 fixed to the compressor casing 10, and a plurality of rotor blades 18 disposed on the rotor 8 so as to be arranged alternately with the stator vanes 16. The compressor 2 may include other constituent elements not illustrated in the drawings, such as an extraction chamber.

In the compressor 2, the air sucked in from the air inlet 12 flows through the plurality of stator vanes 16 and the plurality of rotor blades 18 to be compressed into compressed air G having a high temperature and a high pressure. The compressed air G is fed to the combustor 4 of a latter stage from the compressor 2.

The combustor 4 is disposed in a casing 20. As illustrated in FIG. 1, a plurality of combustors 4 may be arranged around the rotor 8. The combustor 4 is supplied with the fuel F and the compressed air G produced by the compressor 2, and combusts the supplied fuel F to produce combustion gas that serves as a working fluid of the turbine 6. The produced combustion gas is sent to the turbine 6 of a latter stage from the combustor 4. The specific configuration of the combustor 4 will be described later.

The turbine 6 includes a turbine casing 22, a plurality of stator vanes 24 and a plurality of rotor blades 26 disposed inside the turbine casing 22, and a blade ring 27 disposed radially outward of the stator vanes 24 to hole the stator vanes 24. The stator vanes 24 are fixed to the turbine casing 22 via the blade ring 27, and the rotor blades 26 are disposed on the rotor 8 so as to be arranged alternately with the stator vanes 24.

In the turbine 6, the rotor 8 is driven to rotate as the combustion gas passes through the plurality of stator vanes 24 and the plurality of rotor blades 26. As a result, the generator (not shown) connected to the rotor 8 is driven.

An exhaust chamber 30 is connected to the downstream side of the turbine casing 22 via an exhaust casing 28. Thus, the turbine 6 is configured such that the combustion gas having driven the turbine 6 is discharged outside through the exhaust casing 28 and the exhaust chamber 30.

Next, with reference to FIGS. 2 to 5A and 5B, the specific configuration of the combustor 4 according to an embodiment will be described.

Figure 2:
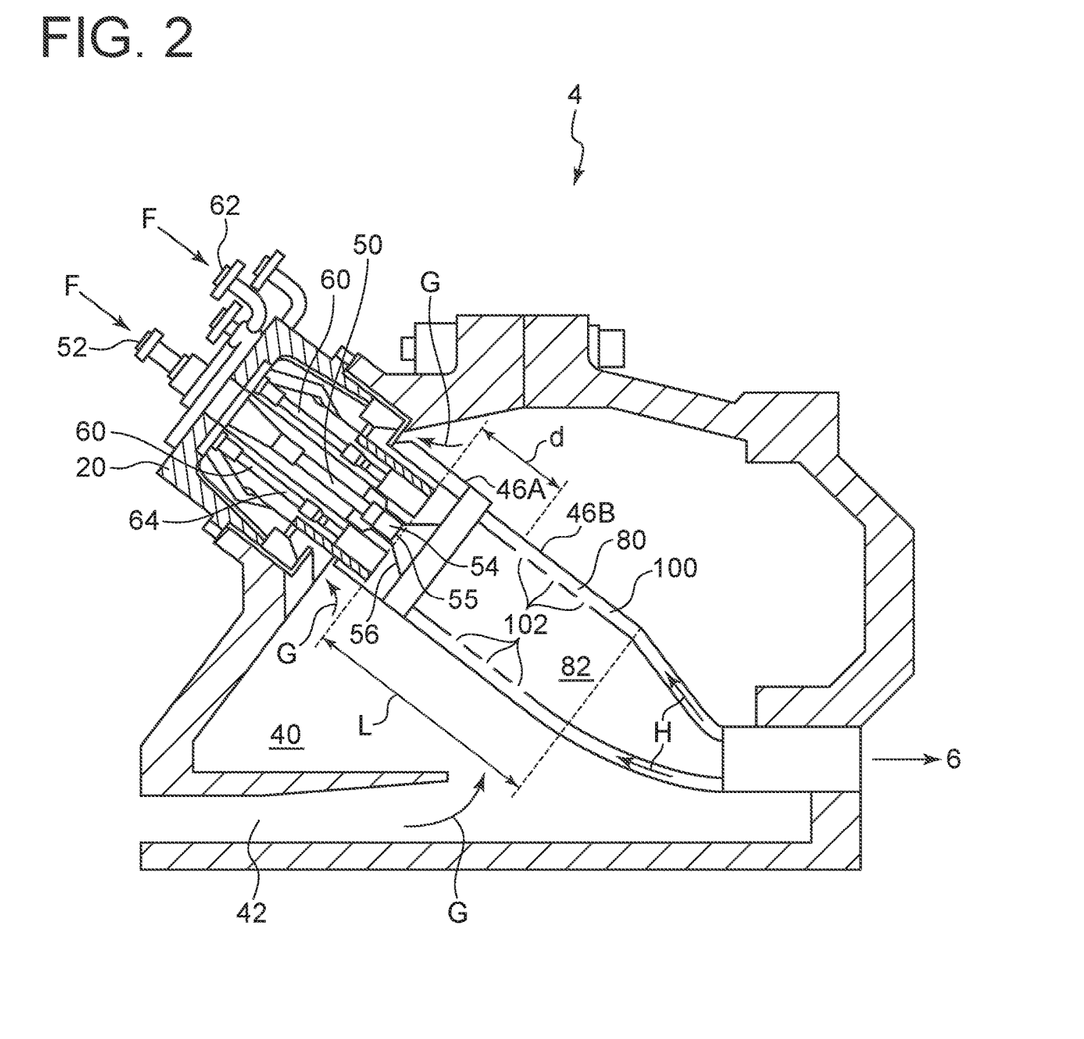
FIG. 2 is a cross-sectional view of a combustor according to an embodiment of the present invention.
Figure 3:
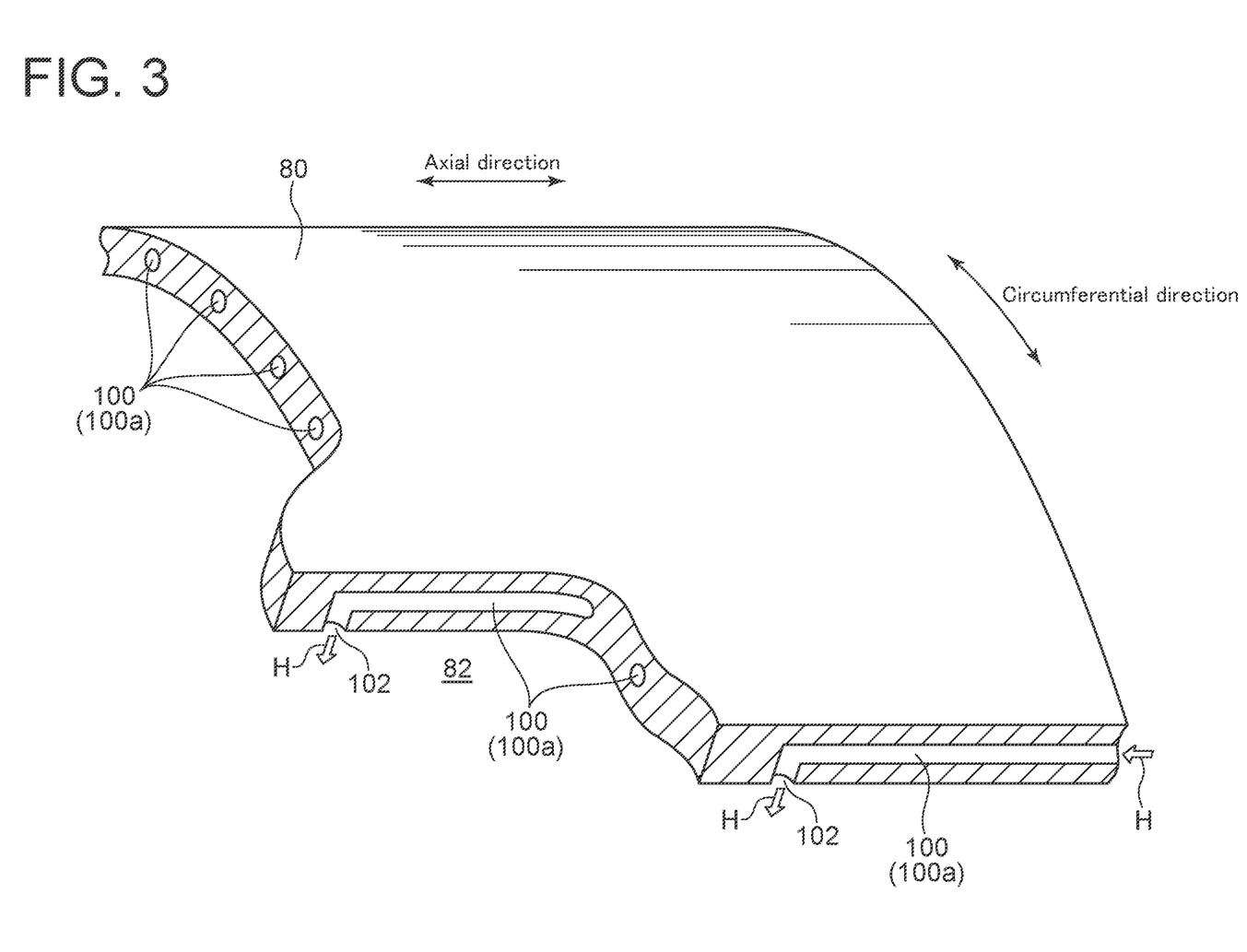
FIG. 3 is a partial cross-sectional view of a part of a combustion liner according to an embodiment of the present invention.
Figure 4:
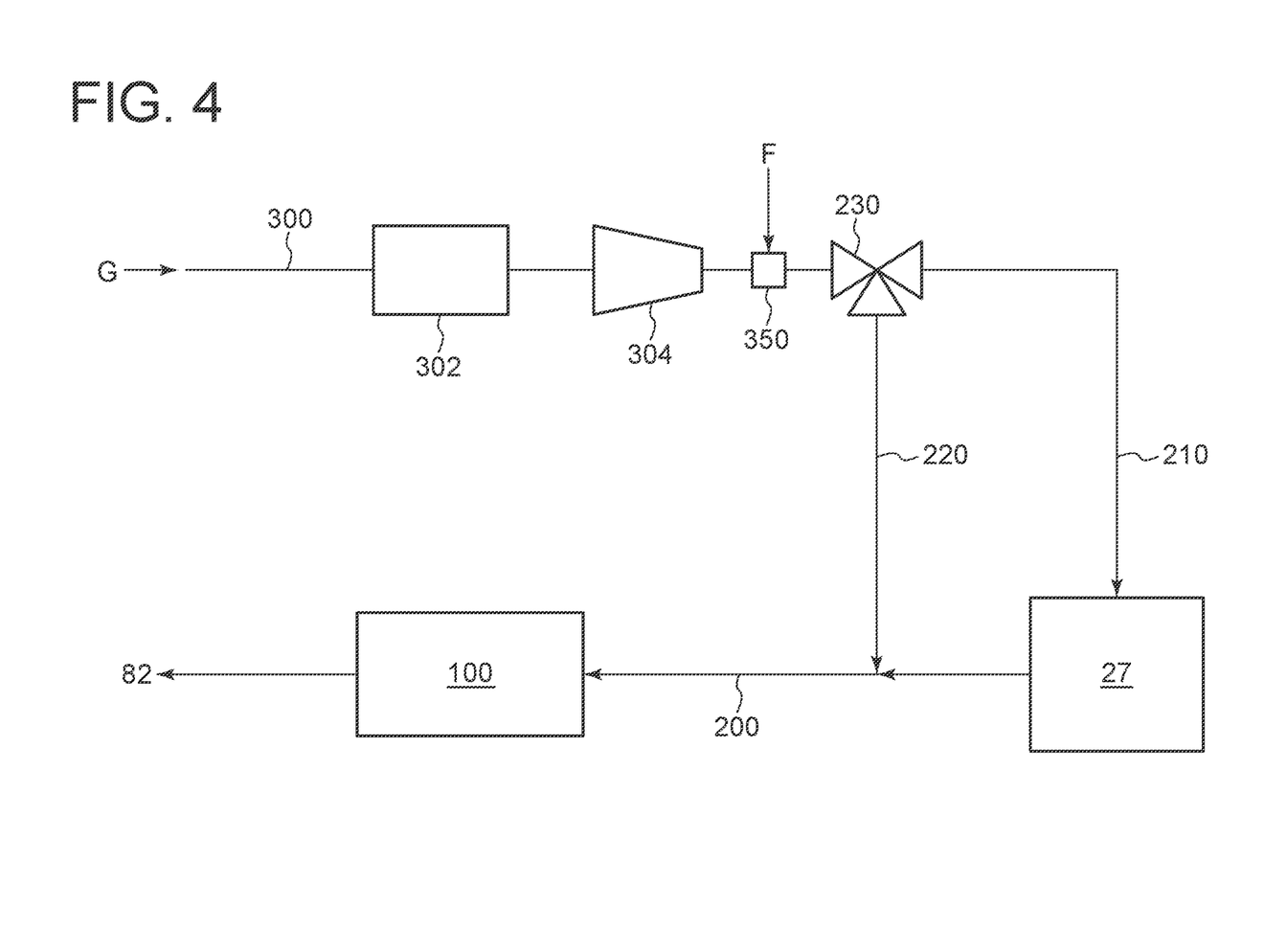
FIG. 4 is a schematic diagram showing a configuration example of a cooling system of a combustion liner according to an embodiment of the present invention.
Figure 5A:
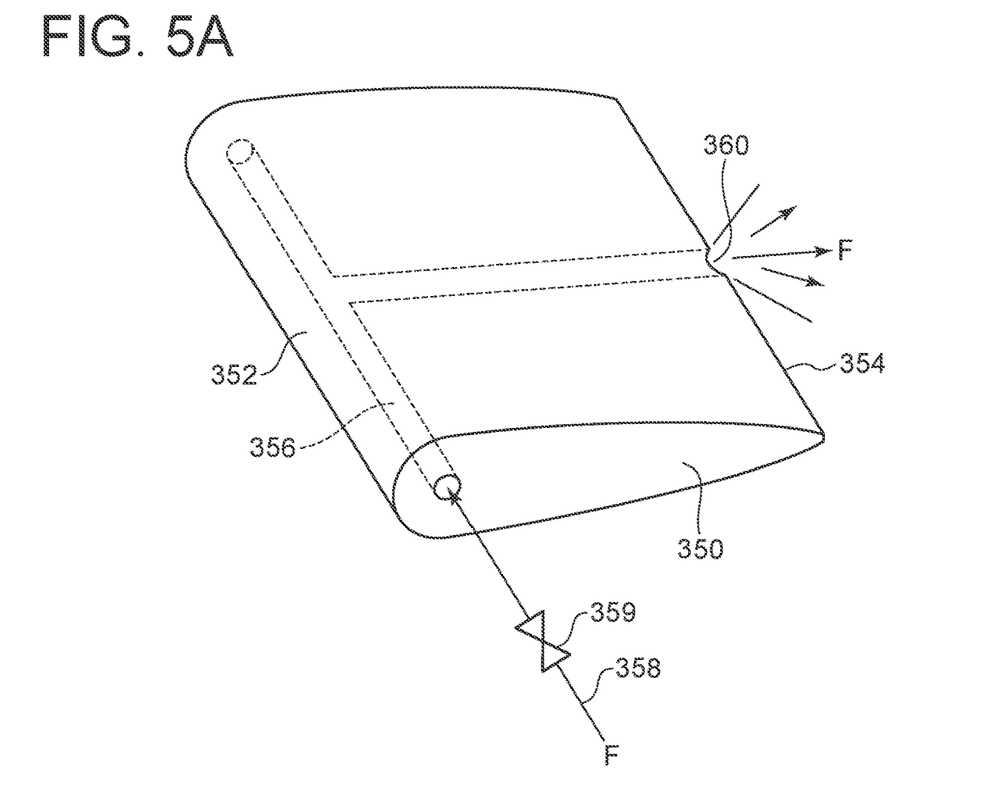
FIG. 5A is a schematic perspective view of a fuel supply part according to an embodiment of the present invention, in which the fuel supply part is incorporated in a cooling system of a combustion liner.
Figure 5B:
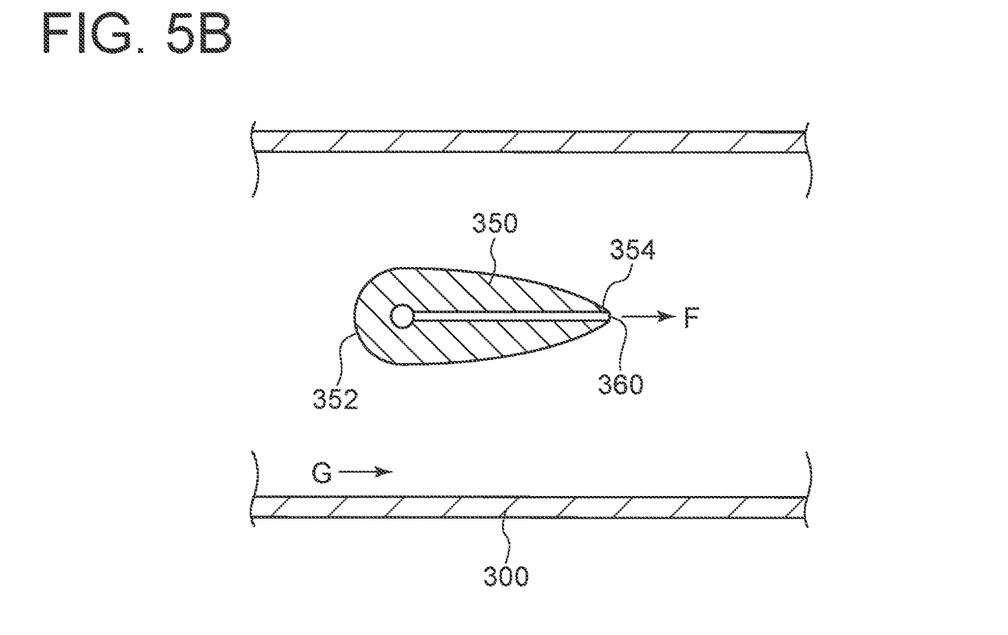
FIG. 5B is a schematic cross-sectional view of a fuel supply part according to an embodiment of the present invention.

FIG. 2 is a cross-sectional view of the combustor 4 according to an embodiment of the present invention. FIG. 3 is a partial cross-sectional view of a part of a combustion liner 80 according to an embodiment of the present invention. FIG. 4 is a schematic diagram showing a configuration example of a cooling system of the combustion liner 80 according to an embodiment of the present invention. FIG. 5A is a schematic perspective view of a fuel supply part 350 incorporated in the cooling system of the combustion liner 80. FIG. 5B is a schematic cross-sectional view of the fuel supply part 350.

As shown in FIG. 2, the combustor 4 includes at least one burner (50, 60), and a combustion liner (combustor liner) 80 disposed in a casing interior space 40 defined by the casing 20 on the downstream side of the burner (50, 60). In the exemplary embodiment shown in FIG. 2, the combustor 4 includes a pilot combustion burner 50 and a plurality of premixed combustion burners 60.

The combustor 4 may include other constituent elements such as a bypass pipe (not illustrated) for allowing the combustion gas to bypass.

The pilot combustion burner 50 is a starter (ignition) burner as a main burner for igniting the premixed combustion burners 60, and includes a fuel nozzle 54 connected to a fuel port 52 and a pilot cone 56 disposed downstream of a fuel nozzle 54.

The plurality of premixed combustion burners 60 are arranged around the pilot combustion burner 50. Each premixed combustion burner 60 includes a main nozzle 64 (fuel nozzle) connected to a fuel port 62.

The combustion liner 80 includes a combustor basket 46A and a transition piece 46B fitted in a tip end portion of the combustor basket 46A. A combustion space 82 is formed in a hollow portion which is inside the combustion liner 80 and surrounded by the inner peripheral surface of the cylindrical wall constituting the combustion liner 80.

In the combustor 4 having the above configuration, the compressed air G generated by the compressor 2 is supplied from a casing inlet 42 into the casing interior space 40, and is further introduced from the casing interior space 40 to the premixed combustion burner 60. After the compressed air G introduced to the premixed combustion burner 60 and the fuel F supplied from the fuel port 62 are premixed in the premixed combustion burner, the premixture is injected from the main nozzle 64 into the combustion liner 80.

Further, the compressed air G introduced from the casing interior space 40 into the combustion liner 80 without passing through the premixed combustion burner 60 and the fuel F supplied from the fuel port 52 and injected through the fuel nozzle 54 are mixed in the combustion liner 80 to form an air-fuel mixture, and the combustion of the air-fuel mixture forms a so-called pilot flame. At this time, the flame (pilot flame) formed by the pilot combustion burner 50 ignites the premixture injected from the premixed combustion burner 60 described above, and stably burns in the combustion space 82 inside the combustion liner 80.

The combustion gas produced in the combustion space 82 passes through the combustion liner 80 and is supplied to the turbine 6 disposed on the downstream side in the combustion gas flow.

The fuel F supplied from the fuel port 52 and the fuel port 62 may be a gas or a liquid, and is not limited to a particular type of fuel. Further, the fuel F supplied to the fuel port 52 and the fuel F supplied to the fuel port 62 may be different types of fuel F. For example, oil fuel may be supplied to the fuel port 52, and gas fuel such as natural gas may be supplied to the fuel port 62.

In the combustor 4 having the above configuration, the combustion liner 80 is heated during the operation of the gas turbine 1. Therefore, as shown in FIGS. 2 and 3, the combustion liner 80 has an internal passage 100 for cooling the combustion liner 80.

As shown in FIG. 4, an air-fuel mixture line 200, which will be described later, is connected to the inlet of the internal passage 100. Thus, the air-fuel mixture H containing the fuel F and the compressed air G is supplied from the air-fuel mixture line 200 to the internal passage 100. On the other hand, as shown in FIGS. 2 to 3, the outlet 102 of the internal passage 100 communicates with the combustion space 82 inside the combustion liner 80. Accordingly, the air-fuel mixture H after flowing through the internal passage 100 and cooling the combustion liner 80 flows into the combustion space 82.

Here, if the coolant for cooling the combustion liner 80 is only the compressed air G, since the total amount of the fuel F supplied to the combustion liner 80 is supplied to the outlet of the fuel nozzle 54 and the outlet of the main nozzle 64, the amount of the fuel F supplied to the outlet of the fuel nozzle 54 and the outlet of the main nozzle 64, and the fuel-air ratio at the outlet of the main nozzle 64 and the outlet of the fuel nozzle 54 are relatively high, compared with the case where the air-fuel mixture H, in which the fuel F (a part of the total amount) is mixed with the compressed air G, is used. In this regard, as in the above configuration, when the air-fuel mixture H, in which the fuel F is mixed with the compressed air G, is used as the coolant for cooling the combustion liner 80, compared with the case where the coolant for cooling the combustion liner 80 is only the compressed air G, the amount of the fuel F supplied to the outlet of the fuel nozzle 54 and the outlet of the main nozzle 64, and the fuel-air ratio (ratio of fuel F to compressed air G, herein) at the outlet of the fuel nozzle 54 and the outlet of the main nozzle 64 are relatively small. As a result, the increase in flame temperature in the vicinity of the outlet of the fuel nozzle 54 and the vicinity of the outlet of the main nozzle 64 is suppressed. It is known that the amount of $NO_X$ produced in the process of combustion of fuel increases as the combustion temperature rises. Therefore, when the increase in flame temperature in the vicinity of the outlet of the fuel nozzle 54 and the vicinity of the outlet of the main nozzle 64 is suppressed, it is possible to reduce the production of $NO_X$.

The air-fuel mixture H supplied from the air-fuel mixture line 200 to the internal passage 100 may be a mixture of any fuel F and compressed air G, generated by the compressor 2, in the casing interior space 40. The fuel F contained in the air-fuel mixture H may be the same as or different from the fuel F supplied to at least one burner (50, 60). Further, as shown in FIG. 2, the air-fuel mixture H may flow in the internal passage 100 in a direction opposite to the flow direction of the combustion gas in the combustion space 82. In addition, as shown in FIG. 2, the internal passage 100 may have a plurality of outlets 102. When the internal passage 100 has a plurality of outlets 102, the outlets 102 may be disposed at different positions in the axial direction of the combustion liner 80.

The internal passage 100 may include, for example, a linear passage 100a formed inside the cylindrical wall constituting the combustion liner 80, although the internal passage 100 is not limited to a specific configuration.

In the exemplary embodiment shown in FIG. 3, the internal passage 100 includes a plurality of linear passages 100a arranged in the circumferential direction inside the cylindrical wall between the inner peripheral surface and the outer peripheral surface of the combustion liner 80. Each linear passage 100a extends in the axial direction of the combustion liner 80.

The linear passages 100a may be arranged at uniform intervals in the circumferential direction. The provision of a plurality of internal passages 100 (linear passages 100a) increases the area in contact between the coolant (air-fuel mixture H) flowing through the internal passage 100 and the combustion liner 80, so that the combustion liner 80 can be cooled more efficiently.

The lengths of the linear passages 100a in the axial direction are not limited to a particular length. The linear passages 100a may have the same length in the axial direction, or as shown in FIG. 3, may have different lengths. In the example shown in FIG. 3, the outlet 102 of the linear passage 100a having a long length is positioned upstream of the outlet 102 of the linear passage 100a having a short length in the axial direction of the combustion liner 80. In this way, when the outlets 102 of the internal passage 100 are dispersedly arranged at different locations in the axial direction, the positions where the fuel F contained in the air-fuel mixture H is combusted are dispersed in the axial direction. As a result, the heat distribution in the combustion space 82 is made uniform in the axial direction, and the combustion vibration of the combustor 4 can be suppressed.

In the axial direction of the combustion liner 80, the outlet 102 of the internal passage 100 is positioned downstream of a downstream end 55 of the fuel nozzle 54 with respect to the combustion gas flow.

For example, $d \geq 0.2 \times L$ may be satisfied, where L is the total length of the cylindrical portion of the combustion liner 80 on the downstream side of the downstream end 55 of the fuel nozzle 54 (in the example shown in FIG. 2, the portion of the combustion liner 80 excluding the non-cylindrical portion on the downstream side of the transition piece 46B), and d is the distance between the downstream end 55 of the fuel nozzle 54 and the outlet 102 of the internal passage 100 (if there are multiple outlets 102, the outlet 102 located on the most upstream side in the combustion gas flow) in the axial direction of the combustion liner 80.

With the above configuration, when the coolant is the air-fuel mixture H containing the compressed air G and the fuel F, since the supply position of the air-fuel mixture H to the combustion space 82 (i.e., the position of the outlet 102 of the internal passage 100 of the combustion liner 80) is set on the downstream side of the downstream end 55 of the fuel nozzle 54 in the axial direction of the combustion liner 80, the fuel F contained in the air-fuel mixture H does not increase the fuel-air ratio in the vicinity of the outlet of the fuel nozzle 54. As a result, it is possible to reduce the combustion temperature of flame in the vicinity of the outlet of the fuel nozzle 54 and thus reduce the production of $NO_X$, compared with the case where the coolant for cooling the combustion liner is only the compressed air.

The inlet of the internal passage 100 with the above configuration is connected to the air-fuel mixture line 200 for introducing the air-fuel mixture H containing the fuel F and the compressed air G to the internal passage 100, as shown in FIG. 4.

As shown in FIG. 4, the air-fuel mixture line 200 may include a blade ring cooling line 210 passing inside the blade ring 27 of the turbine 6. In this case, the air-fuel mixture H as the coolant first passes through the blade ring cooling line 210 to cool the blade ring 27, then passes through the internal passage 100 to cool the combustion liner 80, and finally flows from the outlet 102 of the internal passage 100 into the combustion space 82 of the combustion liner 80. With this configuration, the air-fuel mixture H can be used for cooling not only the combustion liner 80 but also the blade ring 27 of the gas turbine 1.

As shown in FIG. 4, the air-fuel mixture line 200 according to an embodiment may include, in addition to the blade ring cooling line 210, a bypass line 220 bypassing the blade ring cooling line 210. Further, the combustor may further include a passage switching valve 230 configured to switch a passage through which the air-fuel mixture H flows, between the blade ring cooling line 210 and the bypass line 220.

With the passage switching valve 230, it is possible to select whether to use the blade ring cooling line 210 or the bypass line 220 according to the operating condition of the gas turbine 1, and effectively use the air-fuel mixture H as the coolant for cooling.

For example, at the start-up of the gas turbine 1, the blade ring 27 is not heated. Therefore, the bypass line 220 may be selected, and the air-fuel mixture H may be used only for cooling the combustion liner 80. On the other hand, at the rated load of the gas turbine 1, the blade ring 27 is heated compared to the time of start-up. Therefore, the blade ring cooling line 210 may be selected, and the air-fuel mixture H may be used for cooling the combustion liner 80 and the blade ring 27.

The combustor 4 according to the embodiment shown in FIG. 4 may further include a compressed air line 300 for introducing the compressed air G to the air-fuel mixture line 200, and a fuel supply part 350, disposed on the compressed air line 300, for supplying the fuel F to the compressed air G. The fuel F supplied from the fuel supply part 350 and the compressed air G flowing through the compressed air line 300 flow into the air-fuel mixture line 200 as the air-fuel mixture H.

Further, the compressed air line 300 for introducing the compressed air G may be configured to extract the compressed air G from various locations.

For example, the compressed air G may be extracted from an intermediate stage of the compressor 2 shown in FIG. 1, or the compressed air G may be extracted from the casing interior space 40 shown in FIG. 2.

Further, as in the embodiment shown in FIG. 4, the combustor 4 may include a cooler 302 disposed on the compressed air line 300 and a booster compressor 304 disposed on the compressed air line 300. In the exemplary combustor 4 shown in FIG. 4, the booster compressor 304 is disposed downstream of the cooler 302 in the flow direction of the compressed air G. In the combustor 4, the cooler 302 can generate the compressed air having a temperature more suitable for cooling. Further, even if low-pressure air, such as ambient air, is fed to the compressed air line 300, the booster compressor 304 can pressurize the air in the compressed air line 300 to a pressure suitable for supply to the internal passage 100 of the combustion liner 80.

The compressed air line 300, the cooler 302, the booster compressor 304, and the fuel supply part 350 may be disposed outside the casing 20. With this configuration, the compressed air G containing the fuel F is introduced from the compressed air line 300 outside the casing 20 to the air-fuel mixture line 200 inside the casing 20.

Alternatively, the fuel supply part 350 may be disposed on the air-fuel mixture line 200 inside the casing 20. For example, the fuel supply part 350 may be disposed downstream of the blade ring cooling line 210 on the air-fuel mixture line 200. In this case, the fuel F is supplied to the compressed air G after cooling the blade ring 27.

FIG. 5A is a schematic perspective view of the fuel supply part 350. FIG. 5B is a schematic cross-sectional view of the fuel supply part 350.

The overall configuration of the combustor 4 has been described.

Next, with reference to FIGS. 5A and 5B, the configuration of the fuel supply part 350 of the combustor 4 according to an embodiment of the present invention will be described.

As shown in FIGS. 5A and 5B, the fuel supply part 350 for supplying the fuel F to the compressed air G may have an airfoil shape including: a leading edge portion 352 positioned on the upstream side in the flow direction of the compressed air G in the compressed air line 300; and a trailing edge portion 354 positioned on the downstream side of the leading edge portion 352 in the flow direction and having a fuel injection hole 360 for injecting the fuel F downstream in the flow direction. In such a fuel supply part 350, one surface and the other surface may be asymmetrical or symmetrical with respect to the chord connecting the leading edge portion 352 and the trailing edge portion 354. That is, the fuel supply part 350 may be formed in a streamline shape such that eddy does not occur at least on the wake side of the fuel injection hole 360 in the flow direction of the compressed air G; i.e., it may consist of a curve (or curved surface) that does not generate eddy even in a flow and receives the least resistance from the flow. Specifically, the fuel supply part 350 may have a sharp shape whose cross-section along the flow direction of the compressed air G is elongated (or thin) with a front end rounded and a rear end sharpened downstream. When the fuel supply part 350 has the above configuration, on the downstream side of the trailing edge portion 354 of the fuel supply part 350, the formation of a low flow rate region of the compressed air G containing the fuel F (fuel-containing air) can be suppressed. As a result, it is possible to prevent the ignition of the fuel-containing air or flame stabilization in the compressed air line 300.

A fuel passage 356 through which the fuel F flows may be disposed inside the fuel supply part 350. Further, the fuel F may be supplied from an external fuel passage 358 to the fuel passage 356 and then injected from the fuel injection hole 360. Further, a fuel adjustment valve 359 for adjusting the supply amount of the fuel F may be disposed on the external fuel passage 358.

Further, in some embodiments, the concentration of the fuel F in the air-fuel mixture line 200 may be equal to or less than a flammability limit concentration. To adjust the concentration of the fuel F, for example, the supply amount of the fuel F may be adjusted by the fuel adjustment valve 359. When the concentration of the fuel F is equal to or less than the flammability limit concentration, it is possible to prevent the ignition of the air-fuel mixture H in a space other than the combustion space 82 inside the combustion liner 80. Further, it is possible to prevent the temperature of flame from locally increasing in the vicinity of the position where the air-fuel mixture H is supplied to the combustion space 82 when the air-fuel mixture H is introduced to the combustion space 82 and combusted. As a result, it is possible to reduce the production of $NO_X$ in the combustion liner 80.

Embodiments of the present invention have been described above, but the present invention is not limited thereto. Various modifications can be made without departing from the object of the present invention.

REFERENCE SIGNS LIST

1 Gas turbine
2 Compressor
4 Combustor
6 Turbine
27 Blade ring
40 Casing interior space 54 Fuel nozzle
80 Combustion liner
100 Internal passage
102 Outlet
200 Air-fuel mixture line
210 Blade ring cooling line
220 Bypass line
230 Passage switching valve
300 Compressed air line
302 Cooler
304 Booster compressor
350 Fuel supply part
352 Leading edge portion
354 Trailing edge portion
F Fuel
G Compressed air

The invention claimed is:

1. A combustor comprising:
a fuel nozzle for injecting fuel;
a combustion liner surrounding a combustion space for combusting the fuel, the combustion liner having an internal passage having an outlet communicating with the combustion space; and
an air-fuel mixture line for introducing an air-fuel mixture containing the fuel and compressed air to the internal passage, the air-fuel mixture line being connected to an inlet of the internal passage of the combustion liner, the internal passage being configured to direct the air-fuel mixture such that the air-fuel mixture flows in the internal passage in a direction opposite to a flow direction of a combustion gas in the combustion space,
wherein the combustion liner is configured to be cooled by the air-fuel mixture flowing through the internal passage.

2. The combustor according to claim 1, comprising:
a compressed air line through which the compressed air flows; and
a fuel supply part for supplying the fuel to the compressed air flowing through the compressed air line, the fuel supply part being disposed on the compressed air line,
wherein the air-fuel mixture line is configured such that the air-fuel mixture containing the fuel supplied from the fuel supply part and the compressed air flowing through the compressed air line is introduced to the internal passage.

3. The combustor according to claim 2,
wherein the compressed air line is configured to extract the compressed air from an intermediate stage of a compressor of a gas turbine that includes the combustor or a casing interior space of the gas turbine.

4. The combustor according to claim 2,
wherein the fuel supply part has an airfoil shape including:
a leading edge portion positioned on an upstream side in a flow direction of the compressed air in the compressed air line; and
a trailing edge portion positioned on a downstream side of the leading edge portion in the flow direction, the trailing edge portion having a fuel injection hole for injecting the fuel downstream in the flow direction.

5. The combustor according to claim 2, comprising a booster compressor disposed on the compressed air line.

6. The combustor according to claim 2, comprising a cooler, disposed on the compressed air line, for cooling the compressed air.

7. The combustor according to claim 2,
wherein the compressed air line and the fuel supply part are disposed outside a casing in which the combustor is housed.

8. The combustor according to claim 1,
wherein a concentration of the fuel in the air-fuel mixture line is equal to or less than a flammability limit concentration.

9. The combustor according to claim 1,
wherein the outlet of the internal passage is positioned downstream of a downstream end of the fuel nozzle in an axial direction of the combustion liner.

10. A gas turbine, comprising: a compressor for producing compressed air; the combustor according to claim 1; and a turbine configured to be driven by the combustion gas from the combustor.

11. A combustor comprising:
a fuel nozzle for injecting fuel;
a combustion liner surrounding a combustion space for combusting the fuel, the combustion liner having an internal passage having an outlet communicating with the combustion space; and
an air-fuel mixture line for introducing an air-fuel mixture containing the fuel and compressed air to the internal passage, the air-fuel mixture line being connected to an inlet of the internal passage of the combustion liner,
wherein the combustion liner is configured to be cooled by the air-fuel mixture flowing through the internal passage, and
wherein the air-fuel mixture line includes a blade ring cooling line passing inside a blade ring of a gas turbine that includes the combustor.

12. The combustor according to claim 11,
wherein the air-fuel mixture line further includes a bypass line bypassing the blade ring cooling line, and
wherein the combustor further comprises a passage switching valve configured to switch a passage through which the air-fuel mixture flows, between the blade ring cooling line and the bypass line.

13. A combustor comprising:
a fuel nozzle for injecting fuel;
a combustion liner surrounding a combustion space for combusting the fuel, the combustion liner having an internal passage having an outlet communicating with the combustion space; and
an air-fuel mixture line for introducing an air-fuel mixture containing the fuel and compressed air to the internal passage, the air-fuel mixture line being connected to an inlet of the internal passage of the combustion liner,
wherein the combustion liner is configured to be cooled by the air-fuel mixture flowing through the internal passage, and
wherein the internal passage includes a plurality of linear passages extending in an axial direction of the combustion liner.

* * * * *